July 1, 1969 J. P. MILLER 3,452,868
PARALLEL FLOW SEPARATOR
Filed April 3, 1968 Sheet 1 of 5

INVENTOR.
JOHN P. MILLER
BY Lyon & Lyon
ATTORNEYS

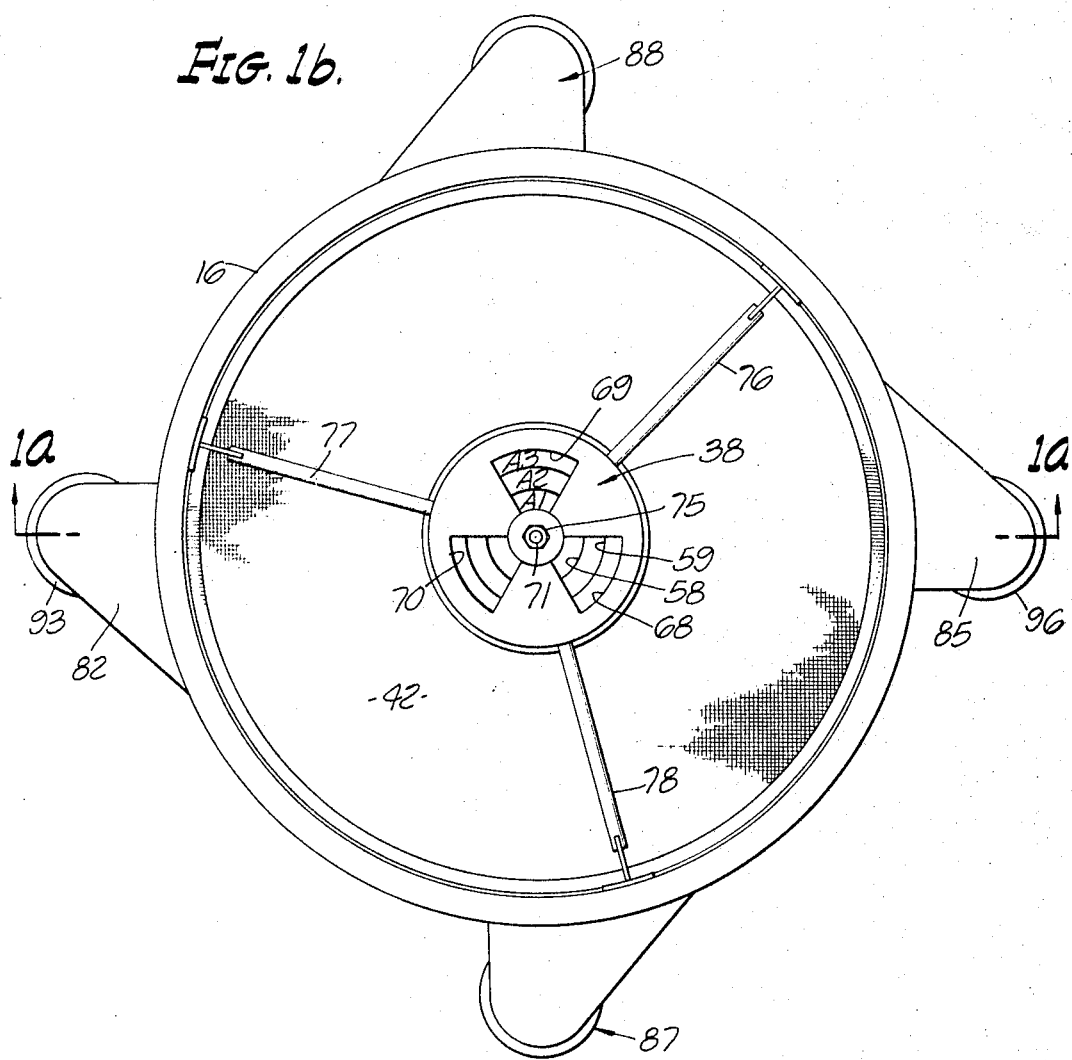

INVENTOR.
JOHN P. MILLER
BY
Lyon & Lyon
ATTORNEYS

INVENTOR.
JOHN P. MILLER
BY Lyon & Lyon
ATTORNEYS

United States Patent Office 3,452,868
Patented July 1, 1969

3,452,868
PARALLEL FLOW SEPARATOR
John P. Miller, Garden Grove, Calif., assignor to Sweco, Inc., Los Angeles, Calif., a corporation of California
Filed Apr. 3, 1968, Ser. No. 724,316
Int. Cl. B07b 1/34
U.S. Cl. 209—254                    14 Claims

ABSTRACT OF THE DISCLOSURE

A vibratory separator employing a plurality of separator screens and wherein a parallel flow of material to the screens is provided. The upper screen or screens are annular and have a central opening. A primary feeder device is mounted above the uppermost screen and may include adjustable openings therein. Material to be separated is fed onto the feeder device, with a portion of the material falling on the upper screen, and a portion of the material passing through the device to the lower screens. Secondary feeding devices are associated with the screens to provide a parallel feed of material to various screens. Means are provided for vibrating the structure to cause the material to move toward the periphery of the various screens and into discharge openings.

---

This invention relates to vibratory separators, and more particularly to the type of vibratory separators employing screens therein, such as those disclosed in Meinzer Patent No. 2,284,671, and Miller et al. Patent Nos. 2,696,302, 2,714,961, 2,753,999 and 2,777,578. Vibratory separators of this type utilize one or more screens and a vibrating means including eccentric weights which cause the screen or screens to vibrate or gyrate. Typically, the material to be separated is fed to the uppermost screen and is caused to spiral outwardly to the periphery of the screen as the same vibrates. Oversize material is discharged through a peripheral chute above a screen while undersize material falls onto a pan for discharge or onto a lower screen.

The screens may be stacked to increase capacity or to effect a more complete grading as to particle size. A variety of screen mesh sizes may be employed. The materials and mixtures which are to be separated may run the gamut of the manufacturing and processing industry. An arrangement which is suitable for one mixture may not be suitable for another; however, the operation of the separator can be adjusted for the specific material or mixture involved. One particular adjustment involves changing the relative angular positions, as well as the mass, of the eccentric weights employed to vibrate the separator. Angular adjustment, for example, affects the dwell time of the material by varying the path taken by the material and by varying the rate at which the material moves outwardly from the point of deposit to the periphery of the screen.

One important characteristic of a separator is its capacity for handling large volumes of material. Although screens may be stacked to increase the capacity of a separator, difficulties have been encountered in properly feeding material to the various screens. Furthermore, typical separators of high capacity are relatively large, heavy, cumbersome and expensive. It is accordingly a principal object of the present invention to provied an improved vibratory separator having increased capacity.

It is an additional object of the present invention to provide an improved separator wherein material is fed to screens thereof in a parallel fashion.

An additional object of this invention is to provide a plural deck vibratory separator including a novel feeding arrangement for the screens of the separator.

These and other objects and features of the present invention will become better understood through a consideration of the following description taken in conjunction with the drawings in which:

FIGURE 1b is a plan view of the separator shown in FIGURE 1a;

FIGURE 1c is an enlarged fragmentary view of a portion of the separator shown in FIGURE 1a;

FIGURE 2b is a plan view of the separator shown in FIGURE 2a;

Briefly, in accordance with the concepts of the present invention, a vibratory separator for separating components of a feed material is provided having two or more screens mounted one above the other. The upper screen or screens each have a central opening and may have a secondary material feed distributor associated therewith. A primary feed distributor is mounted above the uppermost screen and has one or more openings therein to allow a portion of the feed material to pass therethrough. Overflow from the primary distributor flows to the uppermost screen. The secondary or lower feed distributors have graded openings therein for causing respective portions of the feed material which passes through the primary distributor to flow onto separate underlying screens. In this manner, a parallel type flow of material is provided, and the material is distributed evenly, or unevenly if desired, onto the various screens for separation of components of the feed material.

Figure 1A:
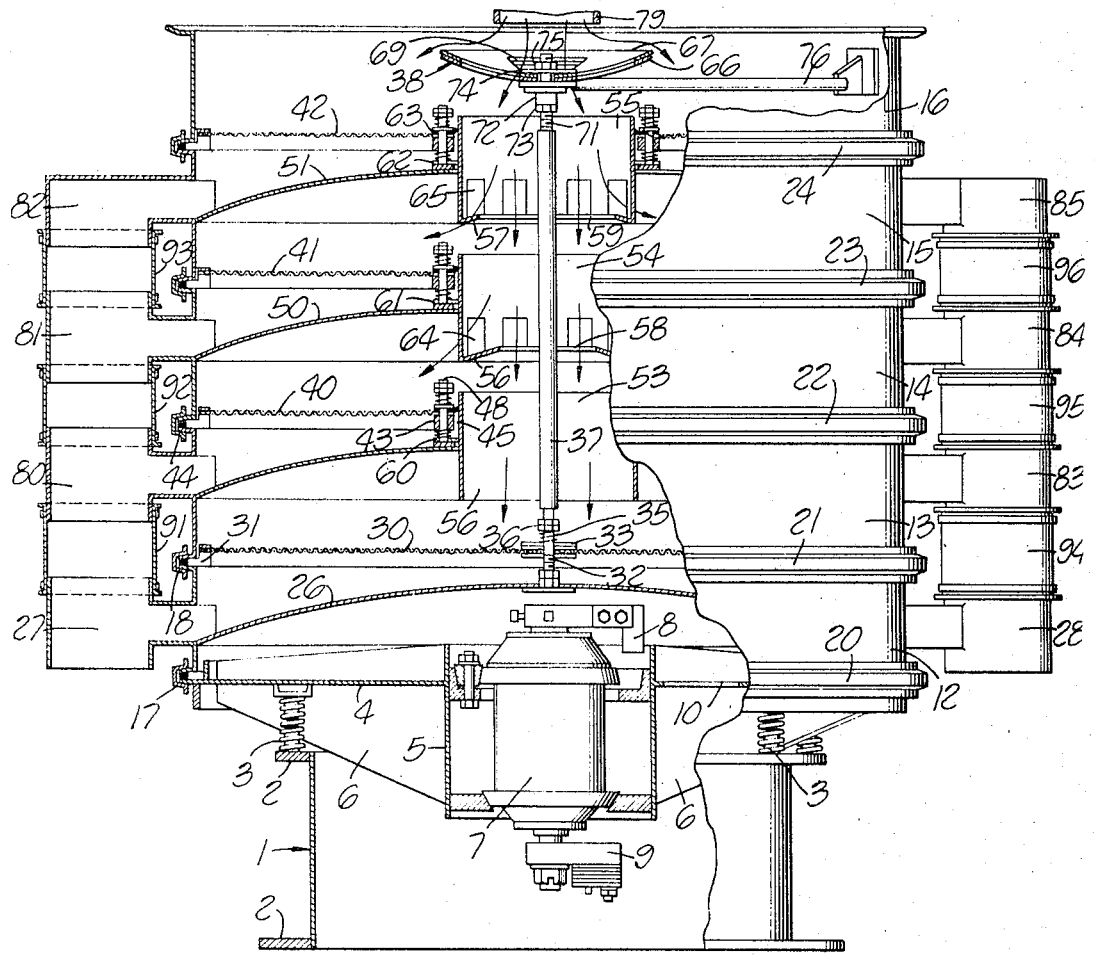
FIGURE 1a is an elevational cross-sectional view of an embodiment of a four deck vibratory separator according to the present invention.

Turning now to the drawings, and first to FIGURES 1a and 1b, there is shown a "four-deck" vibratory separator constructed according to the concepts of the present invention. The apparatus includes a cylindrical base shell 1 having end flanges 2. The upper flange supports a plurality of upright springs 3, the ends of which are suitably attached, as with bolts, respectively to the upper flange and to the underside of a base plate 4. The base plate 4 is circular, and fitted centrally within the base plate is a cylindrical motor shell 5. Radial gussets 6 extend outwardly from the shell 5 and are secured, as by welding, to the underside of the base plate 4. A motor 7 is supported within the motor shell 5. The ends of the shaft of the motor 7 carry upper and lower eccentric weights 8 and 9 such that on rotation of the shaft of the motor 7, the base plate 4 is vibrated or shaken as set forth in the aforementioned Meinzer patent. An opening 10 may be provided in the base plate 4 to enable adjustment of either the mass or angular position of the upper weight 8.

The base plate 4 supports a series of cylindrical sections or shells 12 through 16, each having at its axial extremities radially outwardly extending flanges, such as flanges 17 and 18 on the shell 12. The flanges of adjacent sections are engaged by clamp rings 20 through 24 to retain the various sections together. That is, the clamp ring 20 secures the section 12 to the base plate 4, the ring 21 secures the section 12 to the section 13, and so forth.

Section 12 includes a discharge dome 26 which is in the form of an inverted pan, the periphery of which is welded to the interior wall of section 12. This section includes a pair of discharge spouts 27 and 28 which receive undersize material from the upper surface of the discharge dome 26.

A conventional separator screen 30 of desired mesh has an outer tension ring 31 which fits between the respective upper and lower flanges of sections 12 and 13 and is retained in position by the clamp ring 21. A tension bolt 32 is secured to and projects upwardly from the center of the discharge dome 26 and extends through the center of the screen 30 which has a pair of washers 33 and 34 affixed to the center thereof. A spring 35 and nuts 36 are positioned on the upper end of the bolt 32, adjustment of the nuts 36 enabling the center of the screen 30 to be drawn downwardly for tensioning purposes. The upper end of the bolt 32 may be threaded into a support rod 37 which is affixed to a primary feed distributor 38 at the top of the apparatus for purposes which will be described subsequently.

In a similar manner, screens 40 through 42 are mounted between the respective sections 13–14, 14–15, and 15–16. However, screens 40 through 42 have both inner and outer tension rings and have central openings therethrough. For example, the screen 40 is secured to respective inner and outer tension rings 43 and 44, and includes a central opening 45. A discharge dome 46 underlies the screen 40 in the same manner as the discharge dome 26, but the dome 46 includes a central opening 47. The periphery of the dome 46 is welded to the interior wall of the section 13. A plurality of tension bolts, such as a bolt 48, are secured to the dome 46 around the opening 47 and extend upwardly through the inner tension ring 43 to enable tensioning of the screen 40 in the same manner the tension bolt 32 serves to tension the screen 30. Typically, six bolts 48 are used with the tension ring 43. The screens 41 and 42 are mounted and tensioned in a similar manner and have respective underlying discharge domes 50 and 51.

Figure 1C:
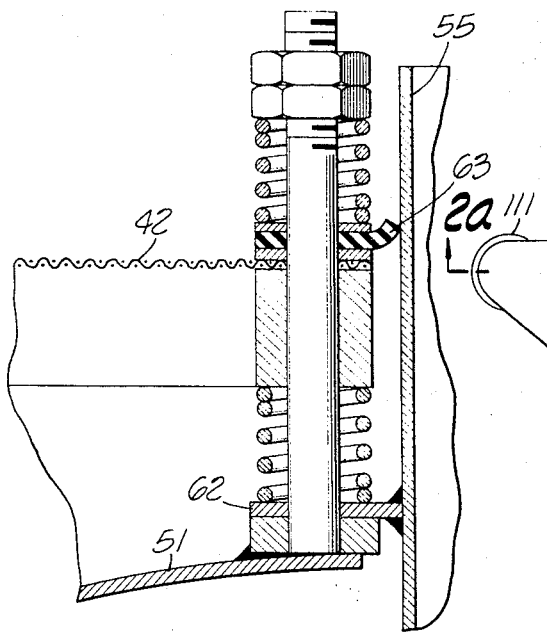

Product feed distributors 53 through 55, which may be termed secondary distributors, are mounted at the central openings of the respective screens 40 through 42. Each of these distributors is in the form of a cylindrical can of lightweight material, such as aluminum or plastic. The distributors 54 and 55 have bottom flanges 56 and 57 defining openings 58 and 59 through the lower ends thereof. The distributors serve to direct feed material to screens 30, 40 and 41 in a parallel fashion. The distributors 53 through 55 include respective rings 60 through 62 thereon which are secured to the respective domes 46, 50 and 51 by the center tension bolts for the screens 40 through 42. If desired, an annular seal gasket of rubber or the like, such as a gasket 63, may be provided between each screen and respective secondary distributor. A gasket of this nature is better illustrated in FIGURE 1c and serves to prevent material from flowing between the inner tension ring and secondary distributor. The cylindrical wall of the distributor 55 along with the openings 58 and 59 in the lower end of the distributors 54 and 55 define a plurality of effective openings $A_1$, $A_2$, and $A_3$ as seen from above in FIGURE 1b, and typically these openings are selected to be of equal area. The distributors 54 and 55 have a plurality of openings 64 and 65 through the lower portion of the walls thereof. These openings 64 and 65 allow material deflected by the flanges 56 and 57 to flow to the respective screens 40 and 41.

The primary feed distributor 38 mounted at the top of the separator includes a pair of dish-shaped discs 66 and 67, each having a plurality of openings 68 through 70 (note FIGURE 1b) therethrough. A stud 71 is coupled with the support rod 37 and extends through the center of the discs 66 and 67. A collar 72 and lock nut 73 are provided on the stud 71, along with a washer 74 and jam nut 75 which serve to secure the discs 66 and 67 to the rod 37 and three radial support rods 76 through 78. The lower disc 66 is affixed to the rods 76 through 78, and the outer ends of the rods 76 through 78 are affixed to brackets which in turn are welded to the interior wall of the section 16. The upper end of the collar 72 is keyed to the suport rods 76 through 78 to prevent rotation of the collar and loosening of the distributor 38/support rod 37 assembly. The nut 75 may be loosened to adjust the position of the disc 67 relative to the disc 66 to vary the effective opening through the distributor 38 provided by the pie-shaped openings 68 through 70. A feed pipe 79 for material to be separated is mounted in any convenient manner above the primary distributor 38. Alternatively, if desired, the distributor 55 can be heightened and the lower disc 66 welded thereto. In this case, the disc 67 is bolted to the disc 66 and no support rods 37 and 76 through 78 are needed.

Discharge spouts 80 through 85, like the spouts 27 and 28, are provided on the periphery of the separator to receive undersize material which passes through the screens. The spouts 80 and 83 receive material from the discharge dome 46, the spouts 81 and 84 receive material from the dome 50, and the spouts 82 and 85 receive material from the dome 51. Although not shown in FIGURE 1a, two sets of like spouts are provided on the separator and communicate with the top of the screens 30, 40, 41 and 42 to receive oversize material which does not pass through the screens. These spouts are generally designated by reference numerals 87 and 88 in FIGURE 1b. A cross-sectional view of two spouts 89 and 90 for oversize material is illustrated for a two deck separator in FIGURE 2a. The individual spouts for undersized material are coupled together, as are the spouts for the oversize material. For example, spout connectors 91 through 93 are coupled between the adjacent spouts 80 through 85 as shown in FIGURE 1a. The oversize spouts are coupled together in a similar manner. The spout connectors may be metal, or may be flexible material, such as neoprene.

In the operation of the separator illustrated in FIGURE 1a, the eccentric weights 8 and 9 coupled with the shaft of the motor 7 are adjusted in angular position and in mass such that when the motor is running, material on the screens is caused to progress outwardly toward the periphery of the screens, ultimately with the oversize material being discharged through the discharge spouts 87 and 88 (FIGURE 1b). As is known to those skilled in the art there is a null point, or small area, vertically along a line extending through the shaft of the motor 7. The motor 7 is preferably mounted relatively high in the shell 5 so that the null point is above the upper screen 42. This provides a better peripheral movement of material on the upper screen than if the null point were below or at the screen 42. The separation to be performed may be with dry feed material where particles of different sizes are separated, or may be with a liquid/solid feed material where the solid and liquid are separated. The material is fed onto the adjustable feed distributor 38 from the feed pipe 79. The relative adjustment of the discs 66 and 67 determines the effective size of the openings 68 through 70 therethrough, and thus the amount of feed material which passes through the primary distributor 38 and the amount which overflows onto the upper screen 42 may be readily selected. The openings 68 through 70 would be selected, for example, to be relatively small for a material feed rate of two tons per hour and large for a high feed rate such as ten tons per hour. Although three openings 68 through 70 are shown, a different number of openings, as well as different shape thereof, may be provided. The openings in the distributor 38 are adjusted so as to provide a substantially equal flow to the four screens for the maximum expected flow from the feed pipe 79. This is accomplished by adjusting the openings with normal flow so that less than one fourth overflows onto the top screen thereby allowing substantially equal distribution for maximum or surge flow. Adjusted in this manner, the lower, more efficient decks are more heavily loaded during normal flow.

As will be apparent, the portion of the material passing through the primary feed distributor 38 bypasses the screen 42 and flows through the center thereof. The effective openings $A_1$, $A_2$, and $A_3$ (FIGURE 1b) provided by the respective distributors 53 through 55 preferably are equal areas as noted above. With this arrangement, the amount of material which bypasses the screen 42 is substantially equally distributed by the distribtuors 53 through 55 to the respective screens 30, 40 and 41 at maximum flow. Thus, the material passing into the distributor 55 is divided with a portion flowing through the openings 65 in the peripheral wall of this distributor 55 onto the screen 41 and a portion flowing through the lower opening 59 passing to the distributor 54. The material passing into the distributor 54 is divided with a portion flowing through the openings 64 in the wall of this distributor 54 onto the screen 40 and a portion flowing through the opening 58 to the distributor 53. The material flowing through the distributor 53 is fed to the center of the screen 30.

Figure 5:
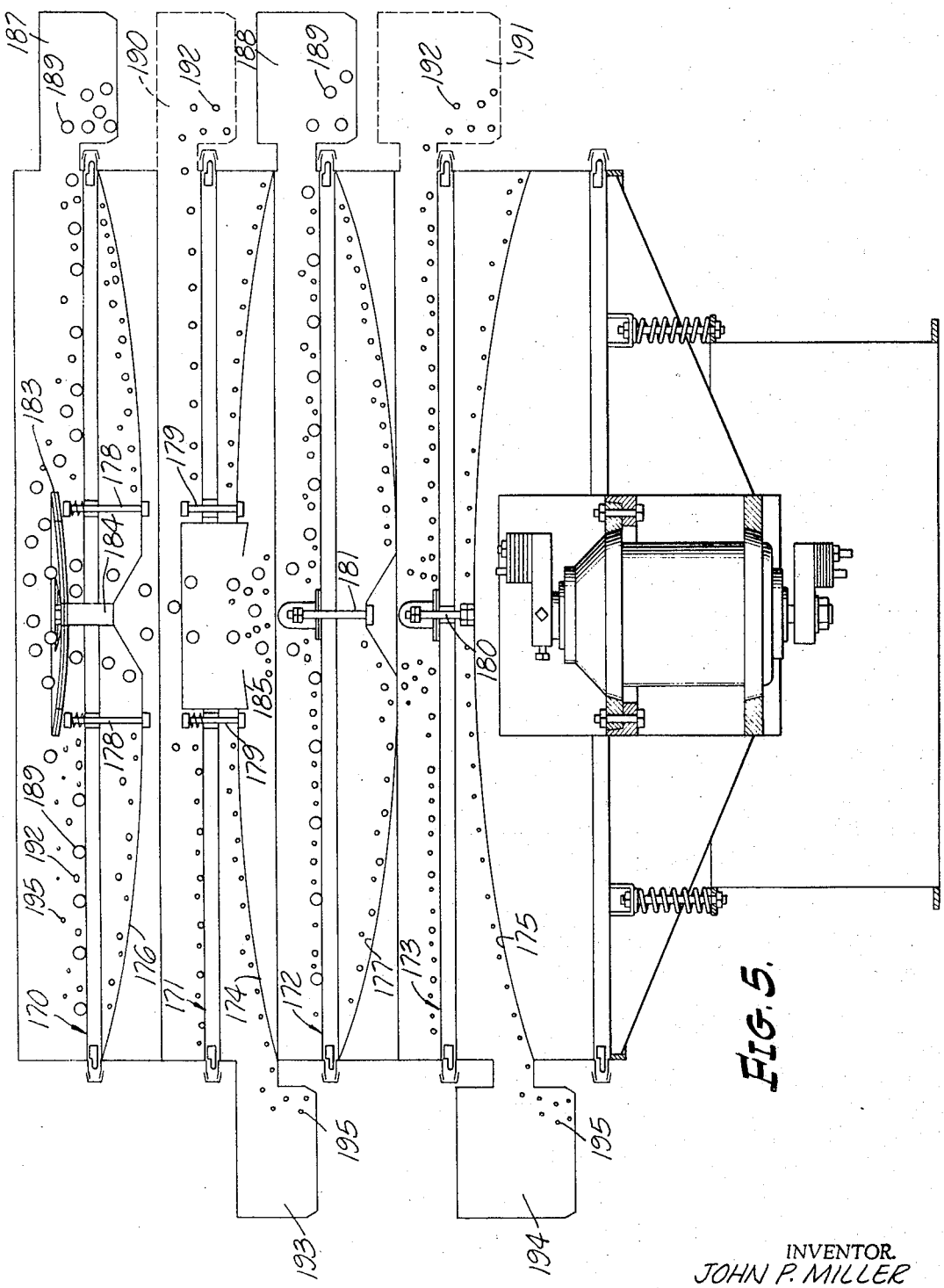

An exemplary separator as illustrated in FIGURES 1a and 1b may have a diameter of sixty inches (diameter of sections 12 through 16), employ four screens and utilize a five horsepower motor. Thus particular arrangement provides approximately eighty square feet of screen area. The diameter of the distributors 53 through 55 may be approximately fourteen inches, the opening 59 in the distributor 55 eleven and three-eighths inches, the opening 58 in the distributor 54 eight inches, and the diameter of the peripheral edge of the openings 68 through 70 thirteen inches. A machine of this nature has the capacity of a typical prior art rectangular vibratory separator which requires approximately three times the floor space, twice the horsepower and is six times heavier than the separator illustrated in FIGURES 1a and 1b. Typically, two to five decks, e.g., sections with screens, are employed, although a greater number of decks may be used. Generally, the screens 30, 40, 41 and 42 have the same mesh, but different mesh screens may be employed as desired. For example, a separator of the nature illustrated in FIGURE 1a may also be used to perform a double separation rather than a single separation by employing different mesh screens. That is, three particle sizes in a feed material of solids may be separated rather than only two particle sizes. A double separation arrangement of this nature is illustrated in FIGURE 5 and will be discussed subsequently.

As noted above, preferably the effective areas $A_1$, $A_2$, and $A_3$ are equal; however, other area relationships may be selected as desired. For example, typically the separation efficiency of the lower screens, such as screen 30, is higher than that of the upper screens because the lower screens are further from the vibration null point. Thus, the area relationships may be changed to ensure a greater feed onto the screen 30 than the feed onto the screen 40, a greater feed onto the screen 40 than onto the screen 41, and so forth.

Figure 2A:
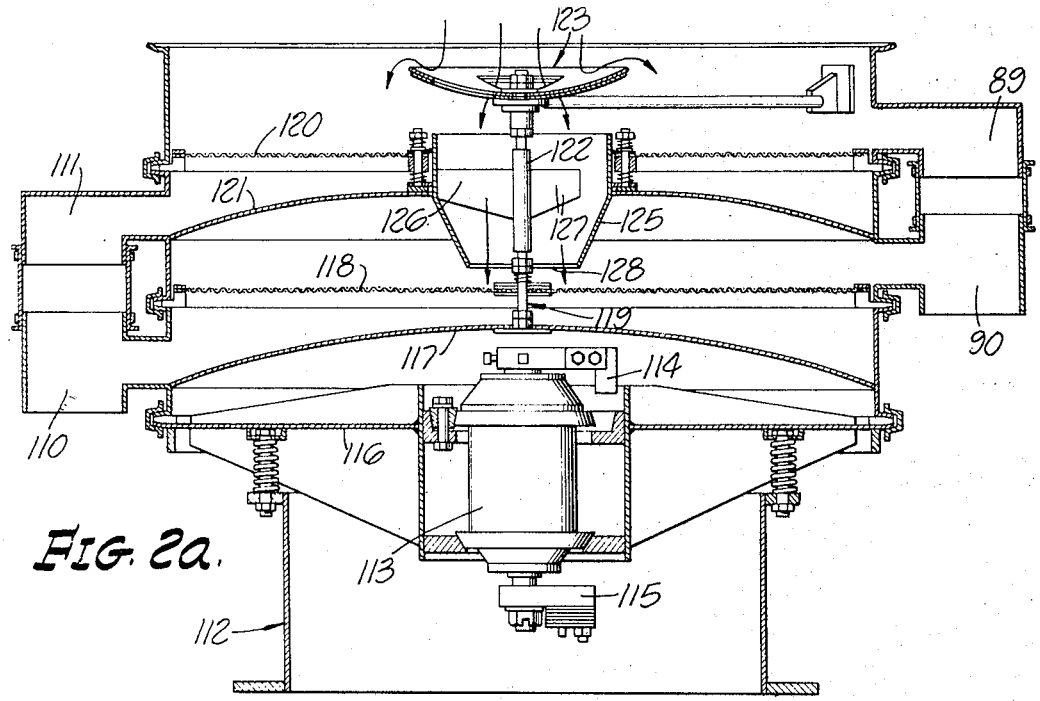
FIGURE 2a is an elevational cross-sectional view of a two deck separator according to the present invention.
Figure 2B:
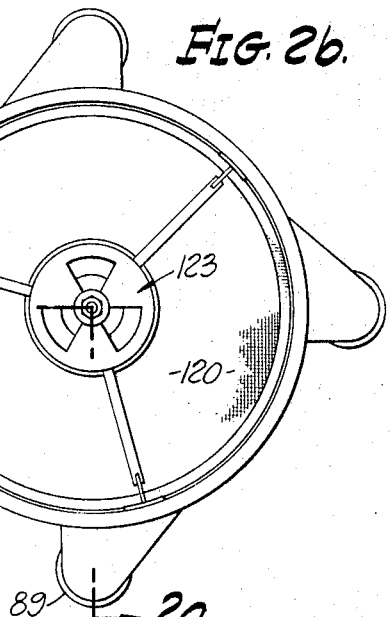

An embodiment of a two deck vibratory separator is illustrated in FIGURES 2a and 2b. FIGURE 2a is a cross-sectional view taken along a line 2a—2a of FIGURE 2b so as to better illustrate in cross-section both the oversize discharge spouts 89 and 90 and undersize discharge spouts 110 and 111. The base assemble 112, including a motor 113, weights 114-115, and base plate 116, along with the lower discharge dome 117, lower screen 118 and lower tension bolt arrangement 119 are the same as in the separator illustrated in FIGURE 1a. Similarly, the shell and clamp rings as well as an upper screen 120 and discharge dome 121 therefor, support rod assembly 122 and primary feed distribtuor 123 and mounting thereof are like the arrangement shown in FIGURE 1a. However, with the separator illustrated in FIGURE 2a, the secondary product feed distributor 125 is affixed to the support rod 122 by a plurality of gussets, such as three, only gussets 126 and 127 being seen in FIGURE 2a. The distributor 125 is frusto-conical and has a lower opening 128 which is appropriately sized to control the rate of feed of material onto the lower screen 118. The openings through the primary distributor 123 are adjusted depending upon the rate of feed of material to the separator as is the case with the distributor 38 of the separator in FIGURE 1a.

Figure 3:
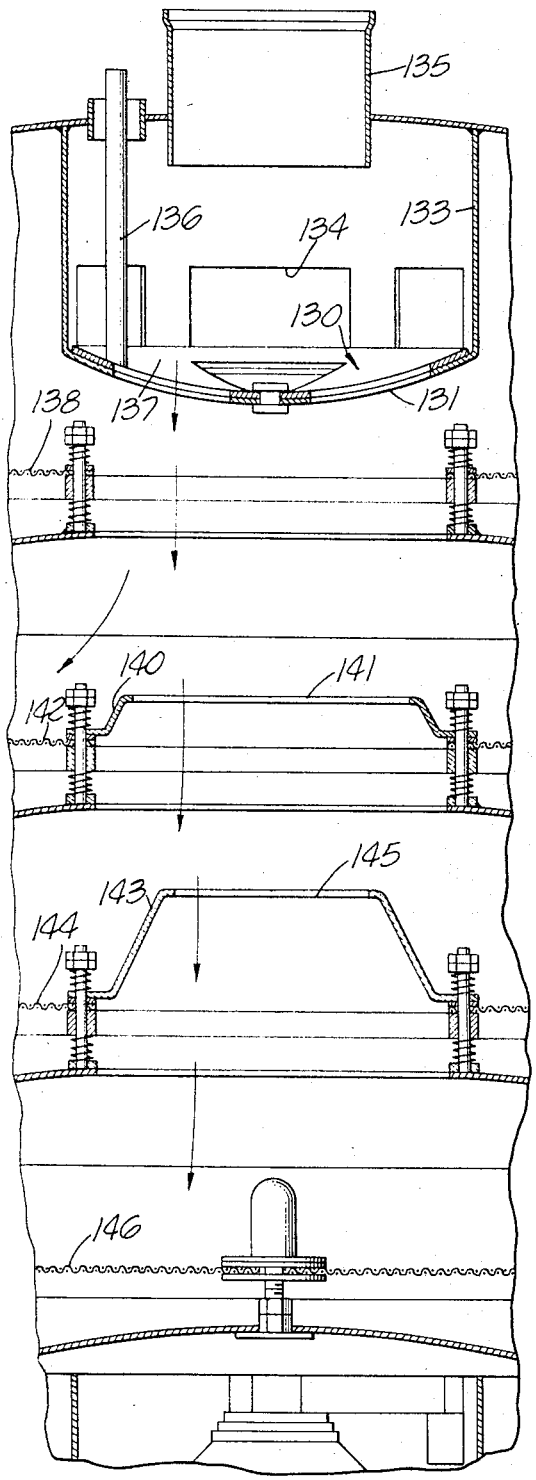
FIGURES 3 and 4 are fragmentary views illustrating alternative feeding arrangements for screens of a separator according to the present invention, and FIGURE 5 diagrammatically illustrates another form of separator and feeding arrangement with which a double separation can be performed.
Figure 4:
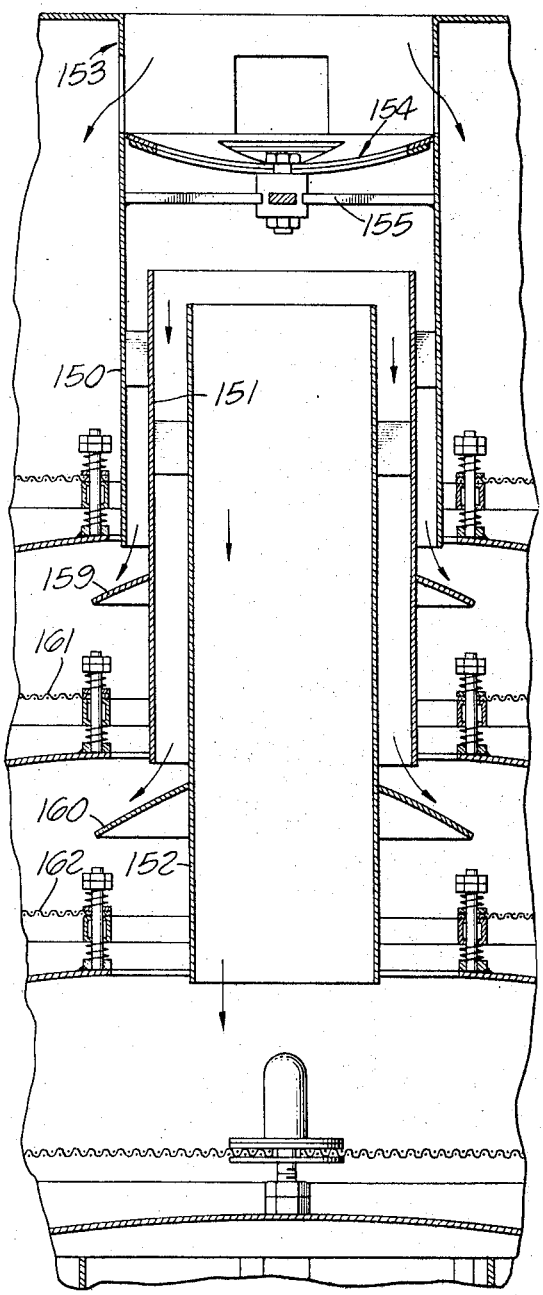

Additional embodiments of feed distributors for a four vibratory separator are illustrated in FIGURES 3 and 4. The basic construction of the separator, that is the mounting of the various sections, screens, motor, and so forth, is the same as for the separator shown in FIGURE 1a, the only difference being in the construction and arrangement of the feed distributors. In the arrangement shown in FIGURE 3, the primary feed distributor 130 has the lower disc 131 affixed to a cover 132 for the separator by means of a cylindrical member 133 having openings 134 therein. A feed spout 135 extends through the cover 132 to direct material onto the distributor 130. An arm 136 is affixed to the upper disc 137 to enable the same to be simply rotated to thereby adjust the opening through the distribtuor 130. As was the case with the separator shown in FIGURE 1a, a portion of the material flows through the distributor 130 and a portion overflows onto an upper screen 138. The material flowing through the distributor 130 passes to the next lower deck, and the flow thereof is divided by a secondary feed distributor 140 having an opening 141 therein. Thus, a portion of the material reaching the second deck passes to the second screen 142 and a portion passes through the opening 141 to the next lower deck where it is again divided by a distributor 143. The material passing to the distributor 143 is divided, with a portion flowing to the screen 144 and a portion flowing through an opening 145 and the distributor 143 onto the lowermost screen 146. As was the case with the separator in FIGURE 1a, the openings 141 and 145 in the respective distributors 140 and 143 are selected to provide the desired flow. These distributors are formed of light weight material such as aluminum or plastic.

Another alternative arrangement is illustrated in FIGURE 4 wherein a plurality of concentrically mounted tubes 150 through 152 are suspended from a material feed pipe 153. A primary feed distributor 154 is mounted within the feed pipe 153 on cross arms 155. The pipes 151 and 152 are coupled together and to the pipe 150 by spacers 156 and 157. Deflectors 159 and 160 are affixed to respective pipes 151 and 152 to deflect feed material onto intermediate screens 161 and 162.

Turning now to FIGURE 5, the same diagrammatically illustrates a four deck vibratory separator similar to that illustrated in FIGURE 1a, but modified to provide a double separation. Four screens 170 through 173 are provided, with the screens 170 and 171 being similar to the screens 40 through 42 of FIGURE 1a, and the screens 72 and 73 being similar to the screen 30 in FIGURE 1a. Discharge domes 174 and 175 underlie respective screens 171 and 173 and are similar to the respective discharge domes 46 and 26 of the separator shown in FIGURE 1a. Discharge pans 176 and 177 underlying the respective screens 170 and 172 are similar to the discharge dome 174 but are inverted. Tension bolts 178 are coupled between the dome 176 and screen 170 for tensioning the screen 170, and tension bolts 179 are coupled between the dome 174 and screen 171 for a like purpose. A tension bolt arrangement 180 like the arrangement shown in FIGURE 1a is provided for the screen 173, and a similar tension bolt arrangement 181 coupled between the dome 177 and screen 172 is provided.

A primary feed distributor 183 is affixed to a support arrangement 184 which is coupled with the pan 176. A secondary distributor 185 is mounted in the central opening of the screen 171 and may have a configuration and be supported as illustrated in either FIGURE 1a or FIGURE 2a. As will be apparent, the distributor 185 has a lower opening of a desired size, preferably of a size to allow substantially equal flows of material to the screens 170 and 172. Discharge chutes 187 and 188 are associated with the respective screens 170 and 172 for receiving a large size material 189. Discharge chutes 190 and 191 are associated with the respective screens 171 and 173 for receiving a medium size material 192. Discharge chutes 193 and 194 are associated with the respective discharge domes 174 and 175 for receiving fine material 195. The mesh size of the screens 170 and 172 is alike and they have a coarse mesh to pass the medium and fine material 192 and 195. The mesh size of the screens 171 and 173 is alike, but smaller than the mesh size of the screens 170 and 172 so as to pass the fine material 195 but exclude the medium material 192. The coarse material 189 does not pass through any of the screens 170 through 173. It will be apparent that the separator illustrated in FIGURE 5 will provide a high capacity separation, and that the flow screens 170 and 172 is a parallel type flow; whereas the flow between adjacent screens, such as between screens 170 and 171, is a serial or cascade type flow.

What is claimed is:

1. A vibratory separator comprising
a housing,
vibratory means coupled with said housing for vibrating said housing,
a lower screen secured to said housing, said housing having discharge means underlying said lower screen,
an upper screen secured to said housing and having a central opening therein, said housing having a discharge pan mounted below said upper screen, said discharge pan having a central opening therein,
secondary feed distributor means mounted at the opening in said upper screen for causing material bypassing said upper screen to be fed onto said lower screen, and
primary feed distributor means mounted above the opening in said upper screen, said primary feed distributor means having an opening therethrough for allowing a portion of material feed to said separator to bypass said upper screen and flow through said secondary feed distributor means onto said lower screen to proportion the amounts of material feed to said upper and lower screens.

2. An apparatus as in claim 1 wherein
said secondary feed distributor means includes a circular member extending through the central opening in said upper screen and through said opening in said pan underlying said upper screen.

3. An apparatus as in claim 2 wherein
said primary feed distributor means comprises a pair of members each having a hole therein, said members being relatively adjustable to vary the effective opening therethrough.

4. An apparatus as in claim 1 wherein
said secondary feed distributor means includes a member extending through said central opening in said upper screen and through said opening in said pan underlying said upper screen, at least a portion of said member having a substantially frusto-conical cross-section narrowing in the direction of feed to said lower screen.

5. An apparatus as in claim 4 wherein
said primary feed distributor includes a pair of members each having a hole therein, said pair of members being relatively adjustable to vary the effective opening therethrough.

6. An apparatus as in claim 1 wherein
said secondary feed distributor means includes a member extending above said central opening in said upper screen, at least a portion of said member having a substantially frusto-conical cross-section.

7. An apparatus as in claim 1 wherein
said secondary feed distributor means includes a tube member extending through said central opening in said upper screen and through said opening in said pan underlying said upper screen.

8. A vibratory separator comprising
a housing,
vibratory means coupled with said housing for vibrating said housing,
a lower screen secured to said housing, said housing having discharge means underlying said lower screen,
an upper screen secured to said housing and having a central opening therein, said housing having a discharge pan mounted below said upper screen, said discharge pan having a central opening therein,
at least an intermediate screen secured to said housing between said lower and upper screens and having a central opening therein, said housing having a discharge pan mounted below said intermediate screen, said last mentioned discharge pan having a central opening therein,
secondary feed distributor means mounted at the central opening of at least said intermediate screen for causing material bypassing said intermediate screen to be fed onto said lower screen, and
primary feed distributor means mounted above the opening in said upper screen, said primary feed distributor means having an opening therethrough for allowing a portion of material fed to said separator to bypass said upper screen and flow through said secondary feed distributor means onto at least said lower screen to proportion the amounts of material fed to said upper and lower screens.

9. An apparatus as in claim 8 wherein
said secondary feed distributor means includes a circular member extending through the central opening in each of said upper and intermediate screens and through said openings in said pans underlying said upper and intermediate screens.

10. An apparatus as in claim 8 wherein
said secondary feed distributor means includes a member extending upwardly from the central opening in said intermediate screen, at least a portion of said member having a substantially frusto-conical cross-section.

11. An apparatus as in claim 8 wherein
said secondary feed distributor means includes a plurality of concentrically mounted pipes with an outer pipe extending through said central opening in said upper screen and an inner pipe extending through the central opening in said intermediate screen, and said primary feed distributor means is mounted within said outer pipe.

12. An apparatus as in claim 8 wherein
the mesh size of said upper screen is greater than the mesh size of said intermediate screen for allowing material passing through said upper screen to pass to said intermediate screen, and wherein said secondary distributor means in combination with said primary distributor means supplies feed material onto said upper and lower screens while bypassing said intermediate screen.

13. A vibratory separator comprising
a housing,
vibratory means coupled with said housing for vibrating said housing,
lower, intermediate and upper screens secured to said housing, said upper and intermediate screens having a central opening therein, and a discharge pan underlying each screen,
secondary feed distributor means mounted at the central opening of said intermediate screen for causing material bypassing said intermediate screen to be fed onto said lower screen, said secondary feed distributor means having a predetermined size opening therein, the diameter of said predetermined size opening in said secondary feed distributor means defining a first area and the diameter of said predetermined size opening and the diameter of the opening in said upper screen defining a second annular area, said first and second areas being substantially equal.

14. A separator as in claim 13 including
a second intermediate screen having a central opening therein, and a discharge pan underlying said second intermediate screen, and
an additional secondary feed distributor means mounted at the central opening of said second intermediate screen and having a second predetermined size opening therein, the diameter of said last named opening and the diameter of said opening in said first named secondary feed distributor means defining a third area, said first, second and third areas being substantially equal.

References Cited

UNITED STATES PATENTS

| 552,995 | 1/1896 | Frey | 209—44 |
| 589,929 | 9/1897 | Bunge | 209—316 X |
| 2,908,391 | 10/1959 | Frevert | 209—315 |
| 3,388,797 | 6/1968 | Herman | 209—317 X |

FOREIGN PATENTS

| 7,838 | 6/1896 | Sweden. |
| 13,593 | 6/1906 | Great Britain. |

HARRY B. THORNTON, *Primary Examiner.*

R. HALPER, *Assistant Examiner.*

U.S. Cl. X.R.

209—316, 332